United States Patent
Vohra et al.

(10) Patent No.: US 6,611,633 B1
(45) Date of Patent: Aug. 26, 2003

(54) COATED FIBER PRESSURE SENSORS UTILIZING PRESSURE RELEASE COATING MATERIAL

(75) Inventors: Sandeep T. Vohra, Fairfax Station, VA (US); Anthony Dandridge, Burke, VA (US); Alan B. Tveten, Ft. Washington, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/534,047

(22) Filed: Mar. 24, 2000

(51) Int. Cl.$^7$ .................................................. G02B 6/00
(52) U.S. Cl. ........................ 385/12; 385/13; 385/141; 385/123; 385/126
(58) Field of Search ...................... 385/12, 13, 141, 385/144, 145, 123, 126, 127, 128

(56) References Cited

U.S. PATENT DOCUMENTS

| | | | | |
|---|---|---|---|---|
| 4,770,492 A | * | 9/1988 | Levin et al. | 250/227.14 |
| 4,979,798 A | * | 12/1990 | Lagakos et al. | 385/12 |
| 5,333,229 A | * | 7/1994 | Sayegh | 385/102 |
| 5,627,921 A | * | 5/1997 | Lidgard et al. | 250/227.14 |
| 6,233,374 B1 | * | 5/2001 | Ogle et al. | 250/227.11 |

* cited by examiner

*Primary Examiner*—Rodney Bovernick
*Assistant Examiner*—Sung Pak
(74) *Attorney, Agent, or Firm*—John J. Karasek; George A. Kap

(57) ABSTRACT

This invention pertains to a sensor comprising of glass optical fiber, a cellular pressure release material surrounding the fiber, and means for determining responsivity of the sensor, the sensor having responsivity of at least about −160 dB re rad/m-$\mu$/Pa, which corresponds to sensitivity of about 50 times better than prior art. The sensor can be made part of an optical interferometer which is characterized by splitting of an entering light beam and measurement of an optical phase shift caused by light traversing different paths. The sensor can form a part of a fiber Bragg grating geometry characterized by a fiber Bragg grating in the glass fiber covered by the cellular pressure release material wherein shift of the Bragg wavelength induced by strain on to the cellular pressure release material is measured.

20 Claims, 4 Drawing Sheets

FBG SHIFT vs PRESSURE (trial 2)

COATED FIBER PRESSURE SENSORS UTILIZING PRESSURE RELEASE COATING MATERIAL

BACKGROUND OF THE INVENTION

1. Field of the Invention

This invention pertains to the field of fiber sensors coated with a pressure release material.

2. Description of Related Art

Since the early days of fiber optic sensor development effort, there has been large scale interest in utilizing coated optical fibers to detect signals of interest. A great deal of effort has been expanded in utilizing existing coatings and/or developing new coatings which are sensitive to a specific measurand, such as pressure, electric, magnetic and temperature fields. The general premise has been that an optical fiber coated with a material which is responsive to a specific measurand would be made part of a highly sensitive fiber interferometer, thus allowing for a high sensitivity fiber optic sensor. The biggest hindrance to this effort has been the elusive nature of appropriate coatings with sufficient responsivity to provide highly sensitive fiber optic sensors, such as surveillance grade acoustic arrays. The stability and reliability of coatings in harsh environments has also been of concern.

In order to circumvent this problem, researchers have developed fiber optic sensors which utilize mechanical transducing geometries with significant amounts of the fiber exceeding 100 m of optical fiber attached to the surface of the transducer. The signal of interest is converted to a strain signal by the transducer and is subsequently transferred to the optical fiber bonded to its surface. This approach has especially been very successful in developing high performance fiber optic dynamic pressure or acoustic signals sensors. In fact, it is quite clear that surveillance grade fiber optic acoustic sensors have reached a level of maturity where they have entered production mode and are considered the sensors of choice for various future systems particularly as hull arrays for the next generation of attack submarines.

While the approach noted above has been very successful, there is still significant interest in moving away from the mechanical transducer approach and investigating the possibility of using fiber optic sensors with coated fibers.

Apart from the potential for providing more simple and potentially cheaper systems, other main reasons which make fiber optic sensors employing mechanical transducers unattractive, at it least for certain applications, are: (i) a typical mechanical transducer tends to be relatively large in size, of approximately 0.5 "diameter by 6" in length, which sets the limit on the array size and geometry, especially true for towed-arrays, (ii) in order to obtain sufficient sensitivity, large amounts of optical fiber exceeding 100 m in length is required on the transducing element, and (iii) first two reasons tend to drive up the overall system cost and also make the overall system more complex. For these reasons, it has been important to continue to explore the utility of fiber optic sensors employing appropriately coated optical fibers. However, as pointed out earlier, coatings with sufficient responsivity to a given measurand field are difficult to find. Table 1, below, summarizes the measured performance of prior art coated optical fiber sensors for detecting pressure signals. It is quite clear that performance of a typical coated fiber sensor does not compare well with a mechanical transducer based fiber sensor.

TABLE 1

| Material | Fiber Diameter (mm) | Measured Responsivity dB re (rad/m-uPa) |
| --- | --- | --- |
| Acrylate (COTS) | 0.25 | −205 |
| Hytrel | 0.9 | −197 |
| Nylon | 0.9 | −195 |
| Alcyrn | 8 | −195 |
| Delrin | 1 | −195 |
| Mech. Transducer (poly-carb. Cylndr.) | 0.25 w/COTS fiber | −165 |

The normalized responsivity in dB re radians/m-$\mu$Pa of a sensor shown in col.3 of Table 1, above, is multiplied by the amount of optical fiber to be used in a sensor to provide the overall scale-factor of a given fiber optic sensor. Since the sensor is typically configured in an interferometer geometry, the scale factor units are in radians/$\mu$Pa, where radians is the fundamental unit of an interferometer and Pascals (Pa) is the fundamental unit of pressure. For instance, a poly-carbonate mandrel-based mechanical transducer utilizing 100 m of fiber has a scale-factor of −125 dB re radians/$\mu$Pa. If the response of such an interferometric hydrophone is demodulated with an electrooptic system whose noise is about −100 dB re radians/$\sqrt{Hz}$ at 1 kHz, then the minimum detectable acoustic signal with that hydrophone would be about 25 dB re $\mu$Pa/$\sqrt{Hz}$, making it an extremely high performance hydrophone, the sea-state 0 being about 45 dB re $\mu$Pa/$\sqrt{Hz}$ at 1 kHz. On the other hand, the best a coated fiber hydrophone would do is have a minimum detectable signal of about 55 dB re $\mu$Pa/$\sqrt{Hz}$ at 1 kHz. Even this is unrealistic since producing coatings with uniform material characteristics over 100 m of optical fiber is non-trivial and additionally, there is the practical issue of packaging 100 m of coated fiber in a reasonable geometry.

The lack of pressure responsivity of a coated fiber sensor has a lot to do with the coating material and how well it makes contact with the optical fiber. Table 1, above, clearly shows that most materials tried so far do not have sufficient pressure sensitivity and would require an unreasonable amount of fiber length to provide sufficient sensitivity for appropriate acoustic detection.

Objects and Brief Summary of the Invention

This invention pertains to a coated fiber pressure sensor wherein the fiber coating is a cellular pressure release material.

Another object of this invention is a fiber sensor coated with a cellular pressure release material which is capable of reducing acoustic radiation of a target.

Another object of this invention is a fiber sensor having an outer layer of a cellular pressure release material in which the pressure field can go to zero at the surface of the material and thus convert the impinging pressure to a displacement in the material.

Another object of this invention is a fiber coated with a pressure release material containing microballoons.

Another object of this invention is a fiber coated with a polymeric material containing microballoons, which sensor is also cheap, disposable and can be more than 50 times more sensitive than prior art coated fiber sensors.

These and other objects of this invention are realized by a fiber coated with a thin layer of a pressure release material containing microballoons having sensitivity to pressure that is more than 50 times more sensitive than prior art coated fiber sensors made part of an optical interferometer or containing an in- fiber grating.

DETAILED DESCRIPTION OF THE INVENTION

Figure 2:
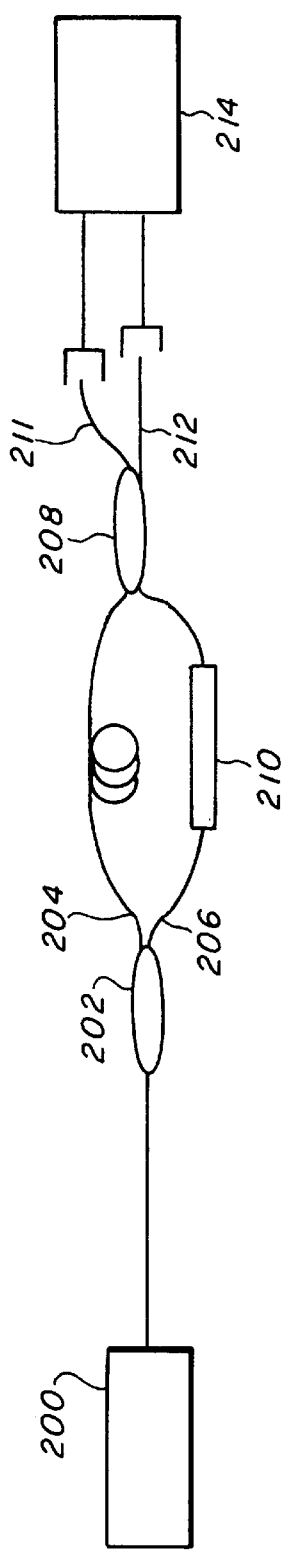
FIG. 2 shows an interferometric sensor with a coated optical fiber.
Figure 3:
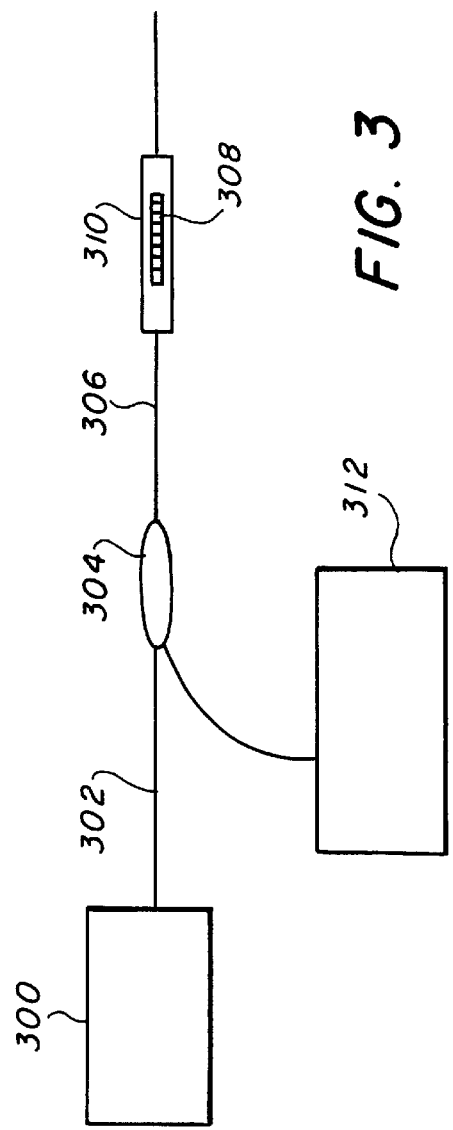
FIG. 3 shows an optical fiber containing a fiber Bragg grating surrounded by a cellular pressure release material.

This invention pertains to a fiber sensor which includes, in its basic form, a glass fiber having on its surface a cellular pressure release material. The cellular pressure release material surrounds a standard optical fiber which then can be made part of an optical interferometer, as shown in FIG. 2, or a coated optical fiber containing a fiber grating, as shown in FIG. 3.

The sensors of this invention have demonstrated a sensitivity, which is synonymous with responsivity, of greater than about 50 times better than the best known prior art coated fiber sensors, and sensitivities greater than 100 times better is readily achievable. For instance, the greater sensitivity is calculated by taking the difference between the measurand responsivity of −195 dB re (rad/m-$\mu$Pa), given in Table 1 for the Delrin coating, and typical responsivity of −153 dB re(rad/m-$\mu$Pa) for a sensor of this invention having an 80 $\mu$m OD optical fiber surrounded with a polyurethane (DURA 9) cellular pressure release material. The difference is 42 dB, which is on a logarithmic scale and is equivalent to sensitivity factor of 126 better than the prior art sensor.

Optical fiber suitable herein is typically a glass fiber of circular cross-section having a core and cladding. The fiber can be of any length desired and is a single-mode fiber of typically 50–125 microns in outside diameter, taking into account only the core and the cladding surrounding the core. The core is typically 5–10 $\mu$m in diameter, with remainder being the cladding. In order to keep most of the transmitted light within the core, the refractive index of the core is designed to be greater than refractive index of the cladding.

The length of the sheath coating, for purposes herein, is not critical but is typically at least about 0.5 cm.

The best prior art investigated has minimum detectable signal of about 55 dB re $\mu$Pa/√Hz at 1 kHz whereas in this invention, it is better or lower than 20 dB re $\mu$Pa/√Hz at 1 kHz.

The material used to coat a glass optical fiber or surround it with a sleeve is a cellular polymeric pressure release material. This cellular pressure release material is extremely compliant and changes volume as it is subjected to a pressure field. Compliance of the material depends on the microballoons or closed cells in the material. The compliant nature of the material can be tailored to provide certain displacement per given pressure.

The cellular pressure release material of interest herein is a material on which the pressure field can go to zero at the surface of the material and the pressure field impinging on the material is converted to an appropriate displacement in the material.

Outside diameter of the cellular material or sleeve thereof around the fiber is typically 100–10,000 microns, more typically 200–1000 microns.

Figures 1A, 1B:
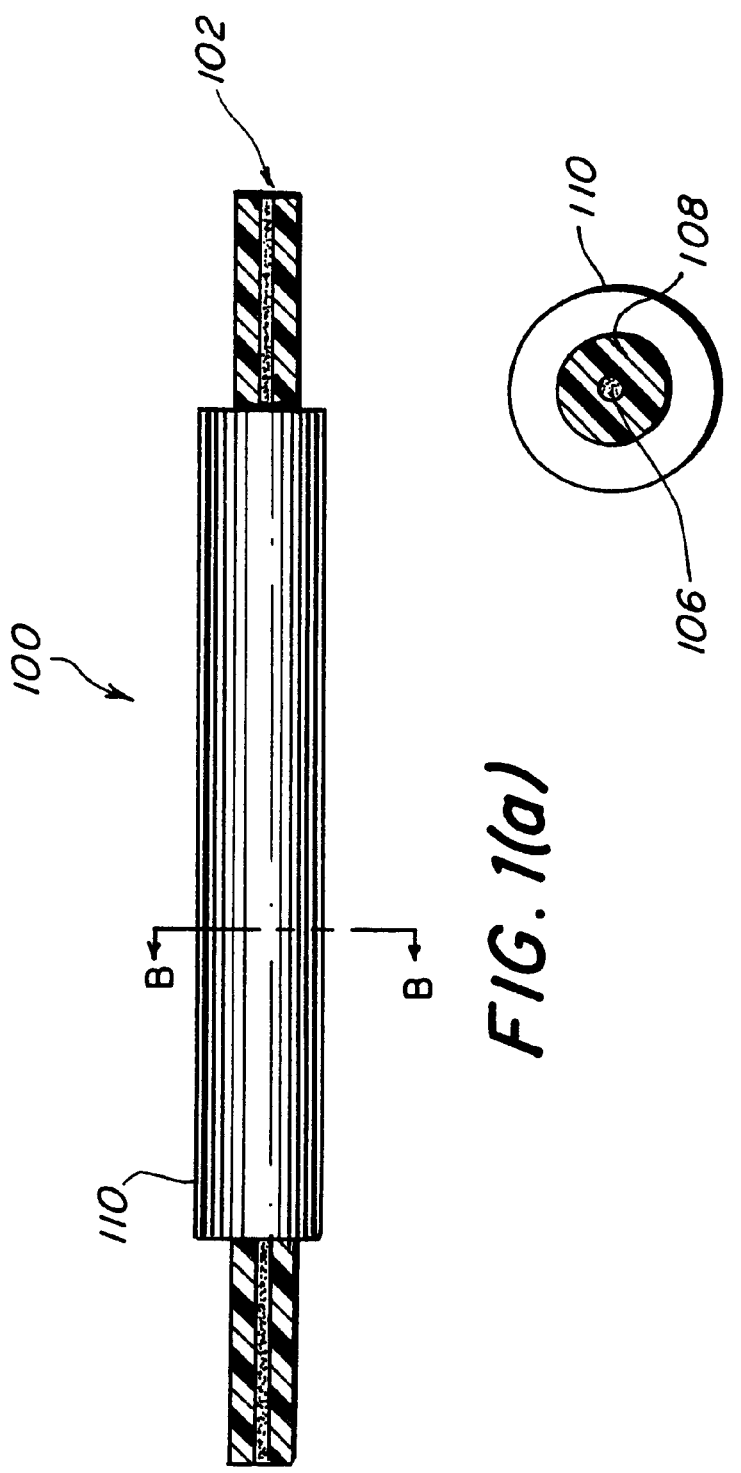
FIG. 1(*a*) shows a sensor comprised of a cellular pressure release material surrounding an uncoated optical fiber, and FIG. (b) is a cross-sectional view of the sensor shown in FIG. 1(*a*).

FIGS. 1(*a*) and (*b*) show sensor 100 of this invention which includes optical single mode fiber 102 having a sheath of a cellular pressure release material 110. As shown in greater detail in FIG. 1(*b*), which is a cross-section of FIG. 1(*a*) taken along plane A—A, fiber 102 is circular in cross-section and is composed of fiber core 106 and cladding 108 surrounding the fiber core. As shown in FIG. 1(*a*), the cellular pressure release material 110 extends over the fiber typically a longitudinal distance of about 2.5 cm. Hydrostatic pressure on an end of the fiber sensor shortens the fiber whereas lateral pressure elongates the fiber and reduces its diameter.

Fiber 102 can have outside diameter of 80 microns with the single mode fiber core 106 of about 10 microns; or fiber 102 can have outside diameters of 125 microns with the single mode fiber core 106 of about 10 microns. Cladding 108 outside diameter can be 80 microns and its core diameter can be 10 microns; or cladding 108 outside diameter can be 125 microns and its core diameter can be 10 microns. The sheath coating length on both the 80-micron and the 125-micron fibers was 2.5 cm.

The cellular pressure release material around the fiber can be applied around the fiber after cutting it in appropriate geometrical shape or can be applied in the actual material fabrication process. Since the material is flexible, the fiber with the material can be laid out in different geometries. In this example, the material was cut in a cylindrical shape and in order to bond it to the optical fiber a hypodermic needle can be passed through the cellular pressure release material and the optical fiber passed through the hypodermic needle. Following this operation, the needle was carefully removed from the material, leaving the cellular pressure release material around the optical fiber. Stops placed on the fiber just outside the pressure to release material can serve to immobilize the material and keep it on the fibers. The pressure release material can also be bonded to the fiber.

The cellular pressure release material suitable herein has certain compressibility as reflected by bulk modulus and Young's modulus determines the signal transfer from pressure release material to the fiber. The material suitable herein is defined by three parameters: Young's modulus, bulk modulus, and responsivity or sensitivity. The Young's modulus is in the range of 120–170 dB re 1/Pa, preferably 130–160 dB re 1/Pa, typically about 145 dB re 1/Pa; bulk modulus of 110–170 dB re 1/Pa, preferably 120–160 dB re 1/Pa, typically about 130 dB re 1/Pa; and responsivity is in the range of 130–190 dB re rad/m-$\mu$Pa, preferably 140–180 dB re rad/m-$\mu$Pa, typically about 155 dB re rad/m-$\mu$Pa. To convert from GPa to dB, and vice versa, the following mathematical relationship can be used:

$$dB = 20 \log (GPa/\text{Pa}) \text{ wherein } GPa = 10^9 \text{Pa}$$

Suitable cellular pressure release material is composed of a polymeric substrate and cavities in substrate that are closed cells formed by the substrate or cavity formed by microballoons. Amount of the microballoons in the substrate material is 1–45% by volume, typically 5–30% by volume. If the cavities in the polymeric substrate are closed cells which are formed by the substrate material, the volume of closed cells in the substrate corresponds to that of the microballoons. The substrate can be any material suitable for purposes herein but is typically polymeric, and more typically thermoplastic. The polymeric substrate material can be selected from polyurethanes, polystyrenes, polyolefins, polyacrylates, polyvinyl acetates, polyvinyl halides, silicone polymers, polytetraflorethanes, and the like.

The microballoons or microspheres, which are commercially available, are small spherical plastic particles consisting of a polymer shell and an encapsulating gas. The diameters of these hollow spheres can be about 10–17 microns and have true density of 1000–1300 kg/M$^3$. When heated, the gas inside the shell increases its pressure and the thermoplastic shell softens, resulting in a dramatic increase of the volume of the microballoons. Fully expanded, the diameters of the microballoons can increase more than 4 times from 10 to 40 microns, in typical diameter values, resulting in a true density below 30 kg/m$^3$. Typical expansion temperature ranges from 80° to 190° C. (176° to 374° F.).

The dramatic expansion of the microspheres on heating is due to the fact that a small amount of a liquid hydrocarbon is encapsulated by a gastight thermoplastic shell and the microspheres are in the expanded condition when the sensor is in operating condition.

The cellular pressure release material can be formed by mixing the microballoons with the substrate material until a good and uniform distribution is obtained whereby the microballoons are generally uniformly distributed throughout the polymeric substrate material. The cavities in the substrate can be formed by mixing a blowing agent with the polymeric substrate material followed by heating to form the closed cells.

FIG. 2 is an embodiment of this invention showing an interferometric sensor with a coated optical fiber. As shown in FIG. 2, light from a light source 200, such as a laser, is routed to coupler 202 where it is split into paths 204, 206. Light in path 204 travels to coupler 208 where it is combined with light traveling through path 206. Light traveling through path 206 travels through a coated fiber sensor 210. After exiting from coupler 208, the light can be split again into paths 211, 212 which are processed in detector 214.

When used to sense signals with the embodiment of FIG. 2, the coated fiber sensor portion of the apparatus is placed into a medium, such as water, where the sensor portion is subjected to a measurand, such as pressure. The pressure induced strain in the fiber is measured as an optical phase shift in the interferometer. This is done either by counting the number of fringes induced in the interferometer as a function of applied hydrostatic pressure to material which is transmitted to the fiber due to reduced fiber diameter or obtaining the phase shift and used as in the technical literature.

Figure 4:
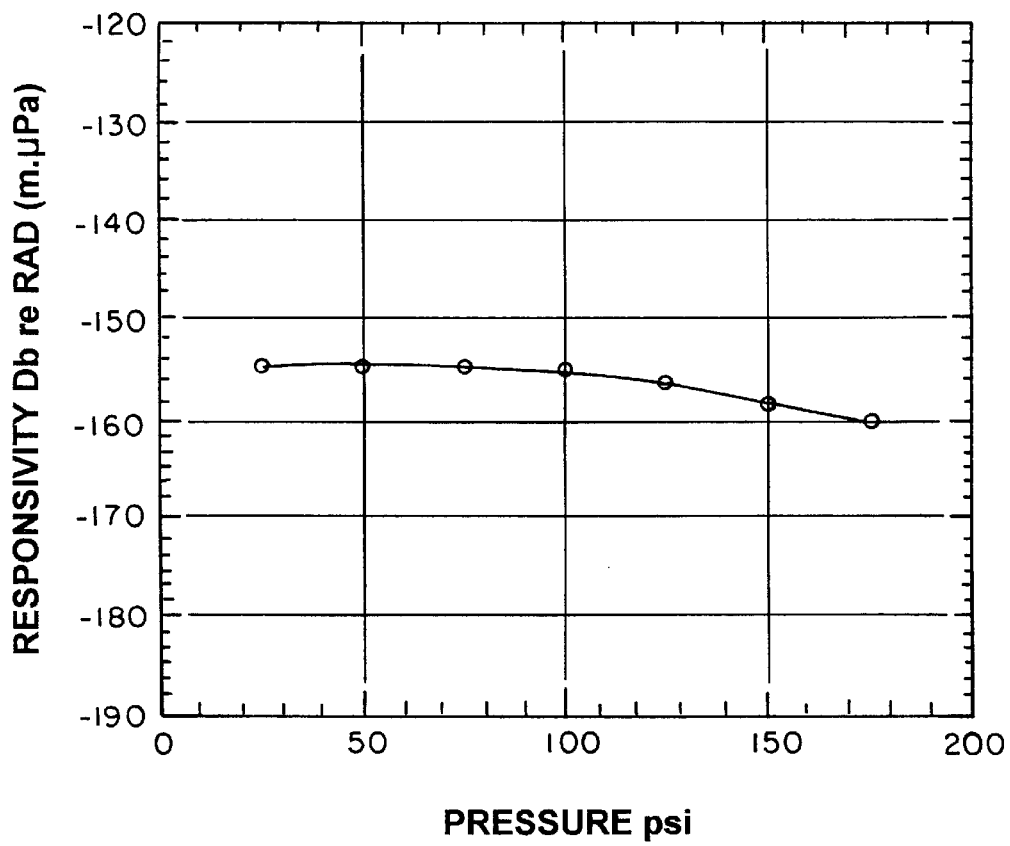
FIG. 4 is a graph of Responsivity v. Pressure showing response of an interferometric sensor containing a coated fiber.

FIG. 4 is the response of the interferometric sensor of the embodiment shown in FIG. 2 in terms of a graph of Responsivity v. Pressure using a glass optical fiber 80 microns in outside diameter with a 10-micron core and a cellular pressure release material composed of polyurethane polymeric substrate containing about 30% by volume percent of expanded Table 2, below, in row 5, shows the measured scale factor for a fiber sensor with a pressure release polyurethane coating as the pressure sensing surface and also compares the responsivity with other prior art coatings.

TABLE 2

| Sensor Type-Coating Type | Responsivity dB re rad/m-$\mu$Pa |
|---|---|
| Acrylate - COTS | −205 |
| Alcryn | −195 |
| Delrin | −195 |
| Pressure Release Material | −153 |
| (e.g. DURA 9) | (165–153) |

Another embodiment of this invention is shown in FIG. 3 where the fiber Bragg grating with a pressure release coating is illustrated. Shown in FIG. 3 is a broadband source 300 which passes light through optical glass fiber 302 to coupler 304, then through fiber 306 and then through fiber (Bragg) grating 308 contained on a portion of fiber 306 coated or covered by cellular pressure release material 310. Reflected light from Bragg grating 308 goes back through coupler 304 and is split-off in wavelength shift detector 312 where the shift is determined. The cellular pressure release material 310 was composed of polyurethane substrate and about 30% by volume percent of expanded microballoons. The glass fiber that was used in FIG. 3 had outside diameter of 125 microns with a core of 8 microns. coating wherein measured was the shift in the Bragg wavelength induced by the strain in the fiber due to the applied pressure. The data in FIG. 5 was arrived at by converting Bragg wavelength shift to equivalent strain using the standard Bragg grating factor of 1.15 nm/$\mu$-strain.

Pressure release material can be used to surround a high strain sensitivity fiber Bragg grating laser sensor to form an extremely small but a highly sensitivity acoustic sensor and such sensors in array form can be multiplexed.

Figure 5:
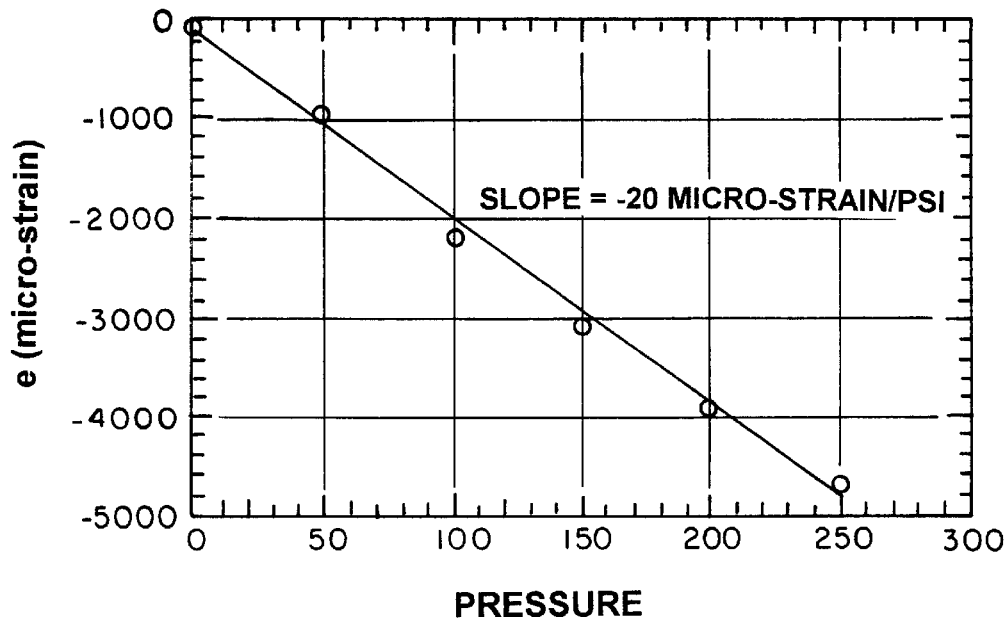
FIG. 5 is a graph of Strain v. Pressure for a fiber grating sensor showing a slope of −20 micro-strain units per psi.
Figure 6:
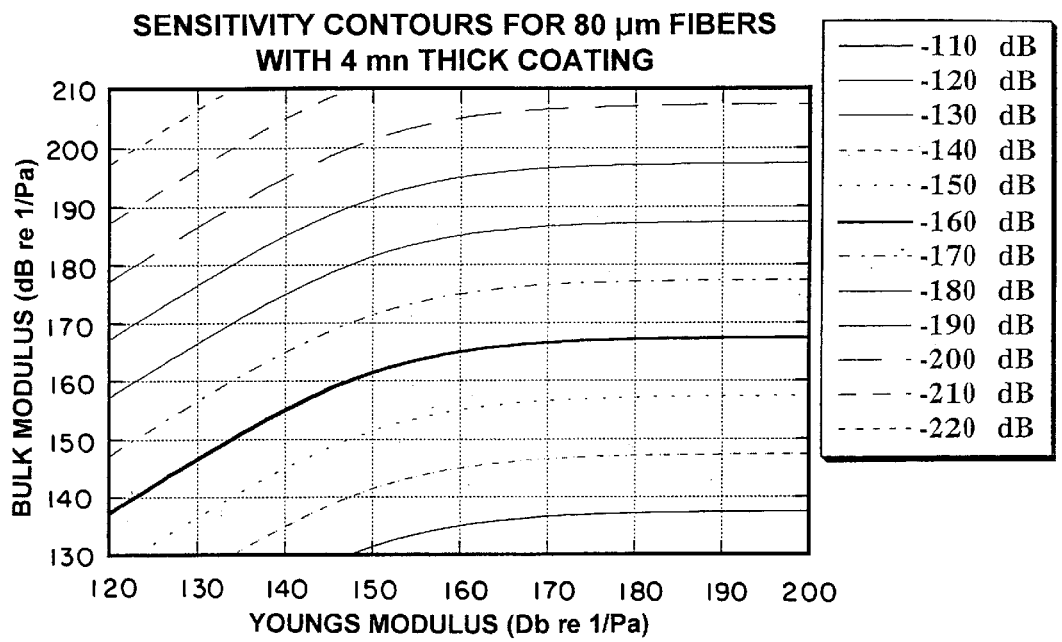
FIGS. 6 and 7 are graphs of Bulk Modulus v. Young's Modulus with responsivity contour lines showing response of polymer coated fibers wherein the fiber is 80 microns (FIG. 6) and 125 microns (FIG. 7).
Figure 7:
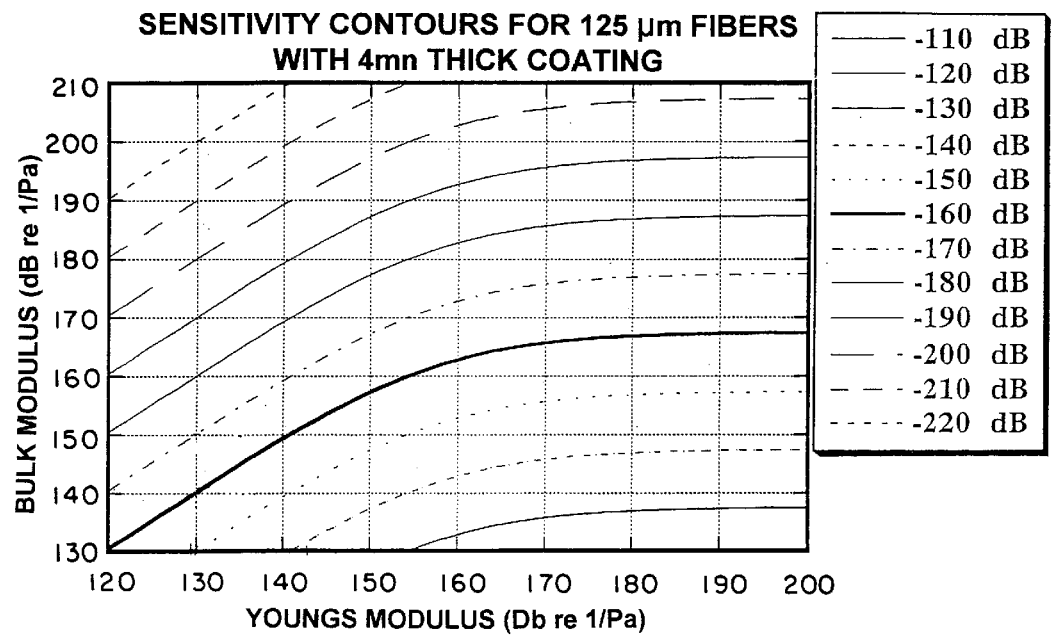

The scale factor from the curve of FIG. 5 is found to be about 20 micro-strain/psi. The minimum detectable pressure using this approach depends on the Bragg grating wavelength shift demodulation schemes used. Table 3, below, summarizes the minimum detectable pressure levels using various grating-based sensor schemes.

TABLE 3

| Grating-Based Sensor Schemes | Min. Detectable Pressure ($\mu$Pa/$\sqrt{Hz}$) |
|---|---|
| Fabry-Perot system | 160 dB |
| Interferometric Demodulation w/WDM | 90 dB |
| Fiber Bragg Grating Laser Sensor | 30 dB |

Note:
14.5 psia corresponds to 10$^5$ Pa

The grating-based sensors such as the Bragg grating sensors, with pressure release coating, especially when used with the Fabry-Perot or the interferometric demodulation approaches, does not compare well with the minimum detectable pressure levels capability of a interferometric sensor. However, grating-based sensors with pressure release coating offer unique features over the interferometric scheme which make them extremely valuable for many applications. Prime amongst it is its ability to measure dc and quasi-static pressure signals which an interferometric sensor containing coated fibers cannot do easily. Such sensors are very useful in distributed array of quasi-static pressure sensors in ships and in other applications, such as in down hole sensing in oil wells. Another advantage is its ability to be easily multiplexed in a wavelength division multiplexing architecture, thus allowing a large number of sensors to be placed on a single fiber. This has the potential to result in significant cost savings.

As is apparent from Table 2, above, the pressure release coatings are extremely sensitive compared to other coatings tried in the past. In fact, comparing the responsivity of pressure release coated fiber sensor to mandrel type mechanical transducer based fiber sensor, it is clear that the pressure release coating is over 10 dB or a factor greater than 3 times more sensitive. This reflects a minimum detectable pressure signal of less than 15 dB re $\mu$Pa/$\sqrt{Hz}$. Thus, the combination of pressure release materials and fiber interferometers have the potential to provide highly sensitive and practical fiber optic pressure sensors.

Optical fibers coated with pressure release materials and formed into a sensor geometry have many advantages over their conventional electrical counterparts and also hold advantages over their mechanical transducer based fiber optic sensor counterparts: pressure release coating provides pressure to displacement transduction mechanism which is over 40 dB better than any other coating tried previously; highly sensitive but small and potentially cost effective pressure sensors can be fabricated very easily out of these materials where the intrinsic sensitivity of optical fiber sensors made from pressure release materials is better than the best fiber sensor based on the principle of mechanical transduction; smaller more compact undersea acoustic sensors with high sensitivity can be fabricated with this approach; fiber Bragg gratings (FBG) surrounded by pressure release materials have the opportunity to provide sensitive, miniature pressure sensors for shipboard measurement of quasi-static and static pressures; the FBG sensors have the potential to provide distributed arrays of quasi-static and static pressure sensors for down-hole applications such as oil wells; FBGs surrounded by pressure release materials can provide inexpensive disposable arrays of medium grade acoustic sensor arrays for shallow water surveillance systems and for airborne anti-submarine applications.

Depending on the application, a proper pressure release material can be chosen to provide either extremely high sensitivity or high dynamic range. Layers of pressure release materials with varying degrees of sensitivity can be used to obtain both high sensitivity and large dynamic range or tailor the response for a specific application or act as a acoustic filter or enhance responsivity in one frequency band while suppressing sensitivity in other frequency bands. Arrays of such sensors can be formed using various multiplexing schemes. This can form the basis of a highly sensitive in-line fiber optic reflectometric array of acoustic sensors.

While presently preferred embodiments have been shown of the novel sensor, persons skilled in this art will readily appreciate that various additional changes and modifications can be made without departing from the spirit of the invention as defined and differentiated by the following claims.

What is claimed is:

1. A fiber optic pressure sensor comprising an optical fiber wherein said fiber is a glass fiber comprising a core and a cladding surrounding said core, refractive index of said core is greater than refractive index of said cladding; a cellular pressure release material surrounding said optical fiber; and means for determining responsivity of said sensor; said pressure release material has Young's modulus of 120–170 dB re 1/Pa and bulk modulus of 110–170 dB re 1/Pa and responsivity of said sensor is from −130 to −190 dB re rad/m-$\mu$m Pa.

2. The sensor of claim 1 wherein said cellular pressure release material includes a polymeric substrate material with a plurality of cavities distributed throughout said substrate material and said fiber is 80–125 microns in outside diameter and said core is 5–10 microns in outside diameter.

3. The sensor of claim 2 wherein said cavities occupy 1–45% of the volume of said cellular pressure release material.

4. The sensor of claim 2 wherein said cavities occupy 5–30% by volume in said polymeric substrate material and are formed from expanded microballoons dispersed in said polymeric substrate material, said microballoons having an unexpanded outside diameter of 10–17 $\mu$m.

5. The sensor of claim 3 wherein said cellular pressure release material has Young's modulus of 130–160 dB re 1/Pa, bulk modulus of 120–160 dB re 1/Pa, and responsivity of said sensor is −140 to −180 dB re rad/m-$\mu$m Pa.

6. The sensor of claim 3 wherein said substrate material is selected form the group consisting of polyurethanes, polystyrenes, polyolefins, polyacrylates, polyvinyl acetates, polyvinyl halides, silicone polymers, polytetrafluoroethanes, and mixtures thereof.

7. The sensor of claim 6 wherein said cellular pressure release material is in the form of a sleeve disposed around said fiber, outside diameter of said sleeve is 100–10,000 microns.

8. The sensor of claim 6 wherein said cellular pressure release material on said fiber has outside diameter of 80–800 microns and its longitudinal extent along said fiber is at least 0.5 cm.

9. An optical pressure sensor comprising a coherent optical source; a first optical path connected to said optical source, wherein said optical path is a glass fiber comprising a core and a cladding surrounding said core, refractive index of said core is greater than refractive index of said cladding; a first coupler connected to said first optical path; a second and a third optical paths connected to said first coupler; said third optical path includes a single mode optical fiber surrounded by a cellular pressure release material which has Young's modulus of 120–170 dB re 1/Pa and bulk modulus of 110–170 dB re 1/Pa and develops an optical path length shift on exposure to a pressure measurand; and means for evaluating the optical path length shift; said sensor is operated by projecting an optical signal from said optical source into said first optical path, projecting the optical signal from said first optical path into said first coupler where the optical signal is split and conveyed to said second and said third optical paths, and processing the signals from said second and said third optical paths to produce a signal relative to the pressure measurand.

10. The sensor of claim 9 wherein said cellular pressure release material includes a polymeric substrate material with a plurality of cavities distributed throughout said substrate material and said fiber is 80–125 microns in outside diameter and said core is 5–10 microns in outside diameter.

11. The sensor of claim 10 wherein said cavities occupy 5–30% by volume in said polymeric substrate material and are formed from expanded microballoons dispersed in said polymeric substrate material, said microballoons having an unexpanded outside diameter of 10–17 $\mu$m.

12. The sensor of claim 11 wherein said cellular pressure release material has Young's modulus of 130–160 dB re 1/Pa, bulk modulus of 120–160 dB re 1/Pa, and responsivity of said sensor is −140 to −180 dB re rad/m-$\mu$m Pa.

13. The sensor of claim 12 wherein said cavities occupy 1–45% of the volume of said cellular pressure release material and wherein said pressure release material is in the form of a sleeve around said fiber, outside diameter of said sleeve is 100–10,000 microns.

14. The sensor of claim 12 wherein said cellular pressure release material on said fiber has outside diameter of 80–800 microns and its longitudinal extent along said fiber is at least 0.5 cm.

15. The sensor of claim 12 wherein said sensor includes a second coupler connected to said second and said third paths.

16. An optical pressure sensor comprising an optical source selected from the group consisting of broadband optical sources, narrowband optical sources, and mixtures thereof; a first optical path connected to said optical source; a coupler connected to said first optical path; a wavelength shift detector connected to said coupler; a second optical path connected to said coupler; an optical fiber having Young's modulus of 120–170 dB re 1/P and bulk modulus of 110–170 dB re 1/Pa in said second optical path; a grating in said fiber in association with said second optical path, said fiber and said grating being surrounded by said pressure release material; said sensor is operated by projecting an optical signal into said first optical path; then projecting the optical signal from said first optical path through said coupler and into said grating where the optical signal, or a portion thereof, is reflected into said coupler through said second optical path and then into said shift detector.

17. The sensor of claim 16 having responsivity from −130 to −190 dB re rad/m-$\mu$m Pa wherein said optical source is a pump laser and wherein said fiber grating is a fiber grating laser.

18. The sensor of claim 16 wherein said cellular pressure release material has Young's modulus about 145 dB re 1/Pa, its bulk modulus is about 130 dB re 1/Pa, and responsivity of said sensor is about −155 dB re rad/m-$\mu$Pa.

19. The sensor of claim 1 wherein said cellular pressure release material is layers of said pressure release materials having varying sensitivity which enables the sensor to have high sensitivity and large dynamic range.

20. The sensors of claim 1 formed into an array having a multiplexing scheme.

* * * * *